US010005063B2

(12) United States Patent
Yoon et al.

(10) Patent No.: US 10,005,063 B2
(45) Date of Patent: Jun. 26, 2018

(54) METHOD OF ADSORBING IODINE OR BROMINE (71) Applicant: SOGANG UNIVERSITY RESEARCH FOUNDATION, Seoul (KR)

(72) Inventors: Kyung Byung Yoon, Seoul (KR); Cao Than Tung Pham, Seoul (KR); Yong Su Park, Gyeonggi-do (KR)

(73) Assignee: Sogang University Research Foundation, Seoul (KR)

( * ) Notice: Subject to any disclaimer, the term of this patent is extended or adjusted under 35 U.S.C. 154(b) by 265 days.

(21) Appl. No.: 14/646,952

(22) PCT Filed: Nov. 25, 2013

(86) PCT No.: PCT/KR2013/010735
§ 371 (c)(1),
(2) Date: Sep. 11, 2015

(87) PCT Pub. No.: WO2014/081259
PCT Pub. Date: May 30, 2014

(65) Prior Publication Data
US 2016/0038912 A1    Feb. 11, 2016

(30) Foreign Application Priority Data
Nov. 23, 2012   (KR) .................. 10-2012-0134078

(51) Int. Cl.
C02F 1/28       (2006.01)
B01D 53/02      (2006.01)
(Continued)

(52) U.S. Cl.
CPC .............. *B01J 20/18* (2013.01); *B01D 53/02* (2013.01); *B01J 20/3408* (2013.01);
(Continued)

(58) Field of Classification Search
CPC .... B01J 20/18; B01J 20/3408; B01J 20/3475; C01B 7/14; C01B 7/096; C02F 1/00;
(Continued)

(56) References Cited

U.S. PATENT DOCUMENTS 3,658,467 A  *  4/1972  Maeck .................. B01J 20/186
                                              423/240 R
4,735,786 A     4/1988  Inoue et al.
(Continued)

FOREIGN PATENT DOCUMENTS

CN       86102713 A      10/1986
CN       101811023 A     8/2010
(Continued)

OTHER PUBLICATIONS

Efe et al, "Minimization of Chemicals Use during Adsorptive Recovery of Succinic Acid", Feb. 2010, Industrial and Engineering Chemistry Research, vol. 49, pp. 3794-3801.*

(Continued)

*Primary Examiner* — Matthew O Savage
(74) *Attorney, Agent, or Firm* — Chainey P. Singleton (57) ABSTRACT The present invention relates to an iodine ($I_2$) or bromine ($Br_2$) adsorbent including a zeolite having a Si/Al ratio of 15 or greater; an $I_2$ or $Br_2$ carrier including the $I_2$ or $Br_2$ adsorbent; a column filled with the $I_2$ or $Br_2$ adsorbent; a article composed of the $I_2$ or $Br_2$ adsorbent or having the $I_2$ or $Br_2$ adsorbent attached thereto; a method for adsorbing or removing $I_2$ or $Br_2$ using the $I_2$ or $Br_2$ adsorbent; an iodine- or bromine-containing zeolite composite including a porous zeolite and iodine ($I_2$) or bromine ($Br_2$) confined in the pores of the zeolite; a semiconductor material including the iodine- or bromine-containing zeolite composite; and a (Continued)

method for preparing an iodine- or bromine-containing product using the iodine- or bromine-containing zeolite composite.

4 Claims, 9 Drawing Sheets

(51) Int. Cl.
*B01J 20/18* (2006.01)
*B01J 20/34* (2006.01)
*C01B 7/14* (2006.01)
*C01B 7/09* (2006.01)
*C01G 5/02* (2006.01)
*C02F 1/00* (2006.01)
*H01B 1/04* (2006.01)
*C02F 101/00* (2006.01)
*G21F 9/12* (2006.01)
*C02F 101/12* (2006.01)
*G21F 9/04* (2006.01)
*C02F 101/10* (2006.01)

(52) U.S. Cl.
CPC ........... *B01J 20/3475* (2013.01); *C01B 7/096* (2013.01); *C01B 7/14* (2013.01); *C01G 5/02* (2013.01); *C02F 1/00* (2013.01); *C02F 1/281* (2013.01); *H01B 1/04* (2013.01); *C02F 2101/006* (2013.01); *C02F 2101/10* (2013.01); *C02F 2101/12* (2013.01); *C02F 2303/16* (2013.01); *G21F 9/04* (2013.01); *G21F 9/12* (2013.01)

(58) Field of Classification Search
CPC .......................... C02F 1/281; C02F 2101/006; C02F 2101/10; C02F 2101/12; C02F 2303/16; B01D 53/685
USPC .................. 423/503; 210/665, 670, 674, 682
See application file for complete search history.

(56) References Cited

U.S. PATENT DOCUMENTS

| 4,748,013 | A | | 5/1988 | Saito et al. |
| 4,765,892 | A | * | 8/1988 | Hulbert ............... C02F 1/004 210/290 |
| 5,515,845 | A | | 5/1996 | Filipovic et al. |
| 6,074,974 | A | | 6/2000 | Lee et al. |

FOREIGN PATENT DOCUMENTS

| CN | 101829542 A | 9/2010 |
| JP | S5492592 A | 7/1979 |
| JP | S59147639 A | 8/1984 |
| JP | S60225638 A | 11/1985 |
| JP | S61242901 A | 10/1986 |
| JP | 2001091694 A | 4/2001 |
| JP | 2002066318 S | 3/2002 |
| JP | 2004510669 A | 4/2004 |
| JP | 20052544209 A | 9/2005 |
| KR | 100146503 B1 | 8/1998 |
| KR | 1020000074883 A | 12/2000 |
| KR | 1020090074422 A | 7/2009 |
| KR | 20140066933 A | 6/2014 |
| WO | 2014081259 A1 | 5/2014 |

OTHER PUBLICATIONS

Sakurai et al, Application of Zeolites to Remove Iodine from Dissolver Off-Gas, (II), Sep. 1983, Journal of Nuclear Science and Technology, vol. 20, Issue 9, pp. 784-786.*
Perez-Pariente et al, "Zeolite Beta", publication date unknown, retrieved on Jun. 15, 2017. Retrieved from the internet: <URL:http://www.iza-online.org/synthesis/Recipes/Zeolite %20Beta.html>.*
Korean Intellectual Property Office (ISA), International Search Report for PCT/KR2013/010735 dated Mar. 6, 2014 (with translation).
Machine translation of Japan Application Publication No. JP 2005-254209 (publ. Sep. 22, 2005), 18 pp.

* cited by examiner

FIG. 1 after 1 min after 2 h after 24 h

METHOD OF ADSORBING IODINE OR BROMINE

CROSS-REFERENCE TO RELATED APPLICATIONS

This application is the National Stage of International Application No. PCT/KR2013/010735, filed on 25 Nov. 2013 claiming the priority of KR 10-2012-0134078 filed on 23 Nov. 2012, the content of each of which is incorporated by reference herein.

BACKGROUND

1. Field

The present invention relates to an iodine ($I_2$) or bromine ($Br_2$) adsorbent including a zeolite having a Si/Al ratio of 15 or greater; an $I_2$ or $Br_2$ carrier including the $I_2$ or $Br_2$ adsorbent; a column filled with the $I_2$ or $Br_2$ adsorbent; a article composed of the $I_2$ or $Br_2$ adsorbent or having the $I_2$ or $Br_2$ adsorbent attached thereto; a method for adsorbing or removing $I_2$ or $Br_2$ using the $I_2$ or $Br_2$ adsorbent; an iodine- or bromine-containing zeolite composite including a porous zeolite and iodine ($I_2$) or bromine ($Br_2$) confined in the pores of the zeolite; a semiconductor material including the iodine- or bromine-containing zeolite composite; and a method for preparing an iodine- or bromine-containing product using the iodine- or bromine-containing zeolite composite.

2. Description of the Related Art

Iodine is a volatile (sublimating), corrosive solid at room temperature. Because of its volatility, it is difficult to accurately weigh the amount of iodine on a scale, and iodine vapor can corrode the scale being used. Likewise, bromine, being a highly volatile and corrosive liquid at room temperature, is difficult to accurately weigh on a scale, and bromine vapor can corrode the scale being used.

Of the 37 known isotopes of iodine, all are radioactive elements except the stable I-127. Whereas most of the radioactive isotopes have very short half-lives of 1 day or shorter, I-124, I-125, I-126, and I-131 have relatively long half-lives of 4-60 days. Among them, I-131 results in the greatest radioactive damage in the event of atomic reactor explosion. I-129 decays over a very long period of time with a half-life of Ser. No. 15/700,000 years. Due to its slow radioactive radiation, it is less dangerous than other radioactive isotopes and is classified as a potential radioactive material since a large amount of radioisotopes, despite slow radioactive radiation, can lead to high radiation doses. However, the capture of this isotope is an important part in the process of nuclear waste because about 0.55% of uranium decays into I-129. Since I-129 exists naturally at a certain level, it can be used as an index for chronometry. That is to say, the trace amount of the naturally existing I-129 captured enables accurate timekeeping.

In solutions, iodine usually exists as iodide ions ($I^-$) and iodine molecules ($I_2$). Theoretically, the iodide anions can be recovered using an anion exchanger. However, once the ions flow into seawater, it is impossible to recover the iodide ions using the anion exchanger because of the high chloride concentration in seawater. The neutral iodine molecules are oxidative and are easily converted into iodide ions via oxidation by various reducing materials present in seawater. Therefore, the neutral iodine molecules need to be recovered from the hydrosphere including the sea or air before they are converted into iodide ions. For this reason, a method allowing for effective capturing of iodine included in water or air may be useful for blocking the propagation of the radioactive iodine.

Until recently, activated carbon or zeolite has been used to recover neutral iodine molecules from water or air. However, these adsorbents tend to reduce a significant amount of the adsorbed neutral iodine to iodide ions. Due to this property, it is difficult to remove iodine, particularly that in water. Therefore, it is necessary to develop an iodine adsorbent or capturing agent capable of capturing neutral iodine well without converting the neutral iodine molecules to iodide ions.

SUMMARY

Activated carbon (AC) is known to adsorb $I_2$ well. However, a considerable amount of the adsorbed $I_2$ is reduced to $I^-$ by reducing materials present in the activated carbon. It is difficult to remove the thus generated $I^-$, and the $I_2$-adsorbing ability of the activated carbon containing $I^-$ is very low. Accordingly, when removing $I_2$ from waste fuel using AC filled into a fixed bed, the AC in the fixed bed should be replaced with fresh AC after several charge-discharge cycles. Accordingly, there is a need for a strong physical adsorbent enabling purely physical adsorption even after many charge-discharge cycles without the need for replacement.

The present inventors have examined various zeolites for their $I_2$-adsorbing ability and formation of $I^-$ following $I_2$ adsorption. As a result, the inventors have found that a zeolite having a high Si/Al ratio adsorbs well not only iodine gas ($I_2$) in the air but also $I_2$ dissolved in water, and the adsorbed $I_2$ can be separated as $I_2$ because it is not reduced to $I^-$. As a result, the zeolite adsorbent can be recycled many times with no decline in adsorbing ability. Also, the inventors have found that the zeolite can adsorb not only $I_2$ but also $Br_2$ as well. In addition, the inventors have found that the iodine ($I_2$) confined in the pores of the zeolite can be readily desorbed using an organic solvent and completely desorbed by heating.

Furthermore, the inventors have found that the iodine- or bromine-containing zeolite composite exhibits semiconductor properties and, accordingly, zeolites in which iodine molecules or bromine molecules are included can be used for various applications.

The present invention is based on these findings.

In an aspect, the present invention provides an $I_2$ or $Br_2$ adsorbent containing a zeolite having a Si/Al ratio of 15 or greater.

Specifically, the zeolite may have a Sanderson partial negative charge on oxygen ($-\delta_0$) of 0.2 or lower.

Non-limiting examples of the zeolite may include SL-1F, Si-BEA, SL-1, ZSM-5, MTW, silica MTW, silica DDR, high-silica DDR (ZSM-58, Si/Al=190), silica SSZ-73, an all-silica clathrasil DD3R, a silica ferrierite, silica TON, silica LTA, silica ITQ-1, silica ITQ-2, silica ITQ-3, silica ITQ-4, silica ITQ-7, silica ITQ-29, silica ITQ-32, a silica zeolite having CHA, STT, ITW or SVR topology, silica FAU, silica AST, a silica zeolite YNU-2 having MSE topology, silica RUB-41, silica ZSM-22, silica MEL, or a zeolite analogue having a Si/Al ratio of 15 or greater. Preferred examples of the zeolite may include silicalite-1 (SL-1), fluoride ($F^-$)-added silicalite-1 (SL-1F) synthesized by adding a fluoride ($F^-$)-releasing reagent, a beta zeolite having a silica backbone (all-silica beta, Si-BEA), TON having a silica backbone (ZSM-22), a ferrierite having a silica backbone (ZSM-35), DDR having a silica backbone, ZSM-5, etc., or a mixture thereof. In the iodine ($I_2$) or $Br_2$ adsorbent according to the present invention, the zeolite may be in the form of powder, foam, or film or may be a blended mixture with a natural polymer, a synthetic polymer, or another zeolite not having superior iodine- or bromine-adsorbing ability.

In another aspect, the present invention provides an $I_2$ or $Br_2$ carrier including the $I_2$ or $Br_2$ adsorbent according to the present invention; a fixed-bed column filled with the $I_2$ or $Br_2$ adsorbent according to the present invention; and a article composed of the $I_2$ or $Br_2$ adsorbent according to the present invention or having the $I_2$ or $Br_2$ adsorbent attached thereto. The article may be clothing.

Non-limiting examples of methods for preparing a zeolite foam or attaching a zeolite onto a substrate are described in Korean Patent Nos. 0392408 and 0607013 owned by the inventors of the present invention, which are incorporated herein by reference.

In another aspect, the present invention provides a method for adsorbing $I_2$ or $Br_2$, including adsorbing $I_2$ or $Br_2$ using the $I_2$ or $Br_2$ adsorbent according to the present invention, the fixed-bed column according to the present invention, or the article according to the present invention.

In another aspect, the present invention provides a method for removing $I_2$ or $Br_2$, including: adsorbing $I_2$ or $Br_2$ using the $I_2$ or $Br_2$ adsorbent according to the present invention, the fixed-bed column according to the present invention, or the article according to the present invention; desorbing the adsorbed $I_2$ or $Br_2$ from the zeolite by bringing into contact with an organic solvent dissolving $I_2$ or $Br_2$, by heating, or by blowing in heated air or nitrogen; and forming an insoluble silver iodide or silver bromide precipitate by reacting the desorbed $I_2$ or $Br_2$ with $AgNO_3$.

In another aspect, the present invention provides an iodine- or bromine-containing zeolite composite including a porous zeolite and iodine ($I_2$) or bromine ($Br_2$) confined in the pores of the zeolite. A known content of iodine or bromine may be captured in the composite.

The iodine- or bromine-containing zeolite composite according to the present invention exhibits semiconductor properties and, thus, can be used as a semiconductor material.

In another aspect, the present invention provides a method for preparing an iodine- or bromine-containing product or a compound generated by an iodine or bromine catalyst, including forming an iodine- or bromine-containing product in an organic solvent dissolving $I_2$ or $Br_2$ via a chemical reaction between iodine or bromine desorbed from the iodine- or bromine-containing zeolite composite according to the present invention by the organic solvent and another compound, or forming the compound in an organic solvent dissolving $I_2$ or $Br_2$ via a catalytic action of the iodine or bromine, desorbed from the iodine- or bromine-containing zeolite composite according to the present invention by the organic solvent. This is based on the point that the iodine- or bromine-containing zeolite composite confines iodine ($I_2$) or bromine ($Br_2$) in pores thereof and the $I_2$ or $Br_2$ may be released by an organic solvent, heat, or contact with hot air or nitrogen.

A zeolite having a Si/Al ratio of 15 or greater can adsorb not only iodine ($I_2$) or bromine ($Br_2$) gas in the air but also $I_2$ or $Br_2$ dissolved in water. In particular, it can adsorb and capture not only the radioactive iodine gas in the air but also the radioactive $I_2$ or $Br_2$ dissolved in seawater or underground water. Furthermore, among the zeolites according to the present invention, a zeolite having a Sanderson partial charge on oxygen ($-\delta^0$) of 0.2 or lower convert neither the adsorbed $I_2$ to $I^-$ nor the adsorbed $Br_2$ to $Br^-$, and can release $I_2$ or $Br_2$ perfectly without loss, by contact with an organic solvent or by heating and, thus, can be recycled indefinitely.

In addition, since the iodine- or bromine-containing zeolite composite according to the present invention, which includes a porous zeolite and iodine ($I_2$) or bromine ($Br_2$) confined in the pores of the zeolite, exhibits semiconductor properties, it may be used as a semiconductor material. Furthermore, since it captures iodine ($I_2$) or bromine ($Br_2$), it may be used for various applications, e.g., as an iodine or bromine carrier or an iodine- or bromine-releasing reagent which releases an exact amount of iodine or bromine.

BRIEF DESCRIPTION OF THE DRAWINGS

FIG. 8a and FIG. 8b respectively show the amount (wt %) of iodide ion ($I^-$) formed inside a solid absorbent (8a) and in a solution (8b) by activated carbon (AC) and various zeolites with time. FIG. 8a shows the amount (wt %) of iodide ion ($I^-$) formed inside the solid absorbent.

DETAILED DESCRIPTION

The term zeolite collectively refers to crystalline aluminosilicates.

The zeolite backbone is composed of tetrahedral units formed by $[SiO_4]^{4-}$ and $[AlO_4]^{5-}$, which are bridged by oxygen atoms. Since the Al of $[AlO_4]^{5-}$ has a formal charge of +3, whereas the Si of $[SiO_4]^{4-}$ has a formal charge of +4, each Al has one negative charge. Accordingly, cations are present for charge balancing. The cations are present not in the backbone but in the pores and the remaining space is usually occupied by water molecules.

Because the site occupied by aluminum in the aluminosilicate backbone is negatively charged, there are cations for charge balancing in the pores and the inside of the pores is strongly polarized.

Meanwhile, various analogues (zeotype molecular sieves), wherein the silicon (Si) and aluminum (Al) constituting the backbone structure of zeolite have been partially or entirely replaced by various other elements, are known. For example, a porous silicalite in which aluminum has been completely eliminated, an ($AlPO_4$)-type zeolite analogue in which silicon has been replaced by phosphorus (P), and other zeolite analogues obtained by replacing the backbone metal atoms of a zeolite or a zeolite analogue with various metal elements such as Ti, Mn, Co, Fe, Zn, etc. are known. These analogues are also included in the scope of zeolite according to the present invention.

Examples of an MFI-type zeolite or an analogue thereof may include ZSM-5, silicalite-1, TS-1, AZ-1, Bor-C, boralite C, encilite, FZ-1, LZ-105, monoclinic H-ZSM-5, mutinaite, NU-4, NU-5, TSZ, TSZ-III, TZ-01, USC-4, USI-108, ZBH, ZKQ-1B, etc. ZSM-5 is an MFI-type zeolite formed of silicon and aluminum of a specific ratio, silicalite-1 is a zeolite consisting only of silica ($SiO_2$), and TS-1 is an MFI-type zeolite in which titanium (Ti) occupies some of the aluminum sites.

Both SL-1 and SL-1F are MFI-type. SL-1 is synthesized without adding $NH_4F$ at all, whereas SL-1F is synthesized by adding $NH_4F$ to significantly increase hydrophobicity.

The chemical composition and the Sanderson partial charge on oxygen of various zeolites are given in Table 1.

TABLE 1

| | Chemical composition (formula) | $-\delta_0$ |
|---|---|---|
| SL-1 | $Si_{96}O_{192}$ | 0.1501 |
| Ag-MOR | $H_{4.0}Ag_{1.2}Al_{5.2}Si_{42.8}O_{96}$ | 0.1596 |
| MOR | $H_{4.0}Na_{1.2}Al_{5.2}Si_{42.8}O_{96}$ | 0.1613 |
| ZSM-5 | $H_{0.2}Na_{0.75}K_{2.75}Al_{3.7}Si_{94.3}O_{192}$ | 0.1684 |
| CaA | $H_{15}Ca_{22.5}Na_{34.5}Al_{94.5}Si_{97.5}O_{384}$ | 0.2615 |
| NaY | $Na_{52.3}Al_{52.3}Si_{139.7}O_{384}$ | 0.2640 |
| NaA | $H_6Na_{88.5}Al_{94.5}Si_{97.5}O_{384}$ | 0.3251 |
| NaX | $H_3Na_{92.7}Al_{95.75}Si_{96.25}O_{384}$ | 0.3367 |

When $I^-$ is generated in an $I_2$ adsorbent, the $I_2$ adsorbent can no longer adsorb $I_2$ and the $I^-$ is difficult to remove therefrom. When the $I^-$ exists in a solution, it can be removed using an anion exchange resin or a silver solution. However, when the $I^-$ exists inside the adsorbent, it cannot be removed even with the anion exchange resin or silver solution. The inventors of the present invention have examined various zeolites for their $I_2$-adsorbing ability and formation of $I^-$ following $I_2$ adsorption. As a result, the inventors have found that there are some zeolites which do not generate or hardly generate $I^-$ after $I_2$ adsorption, particularly in water.

A more detailed description is given herein below.

Figure 1:
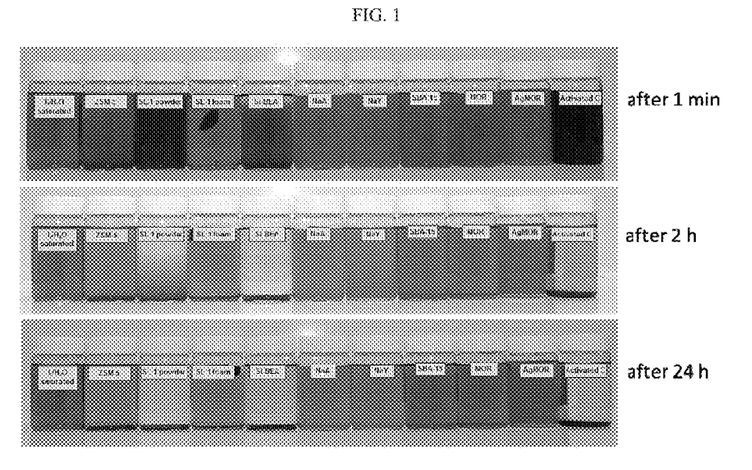
FIG. 1 shows absorption of $I_2$ from its saturated aqueous solution onto activated carbon (AC) and various zeolites SL-1F, Si-BEA, SL-1, ZSM-5, AgMOR, SBA-15, NaY, MOR, NaX, NaA, and CaA as solid absorbents.

The $I_2$ concentration of a saturated $I_2$ aqueous solution is ~1.5 mM. It was investigated whether activated carbon (AC) and various zeolites ZSM-5, SL-1 powder, SL-1 foam, Si-BEA, NaA, NaY, SBA-15, MOR, and AgMOR adsorb the $I_2$ saturated in water well (FIG. 1). As seen from FIG. 1, activated carbon, zeolite ZSM-5, SL-1 powder, SL-1 foam, and Si-BEA can adsorb $I_2$ in water.

Figure 2:
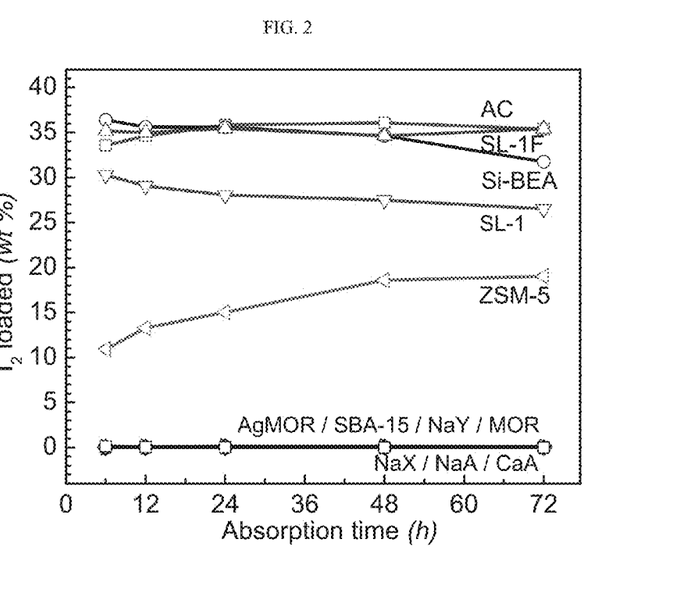
FIG. 2 shows the absorbed amount (wt %) of iodine ($I_2$) (the amount (g) of absorbed $I_2$ per 100 g of zeolite) with time for activated carbon (AC) and various zeolites in aqueous solutions.

Meanwhile, the adsorption amount (wt %) of iodine ($I_2$) with time for activated carbon (AC) and various zeolites SL-1F, Si-BEA (all-silica zeolite-β), SL-1, ZSM-5, AgMOR, SBA-15, NaY, MOR, NaX, NaA, and CaA was measured in aqueous solutions. As seen from FIG. 2, activated carbon and zeolite SL-1F, BEA, SL-1, and ZSM-5 showed high iodine ($I_2$) adsorption amount of 15 wt % or greater, whereas AgMOR, SBA-15, NaY, MOR, NaX, NaA, and CaA hardly adsorbed iodine ($I_2$).

Figure 3:
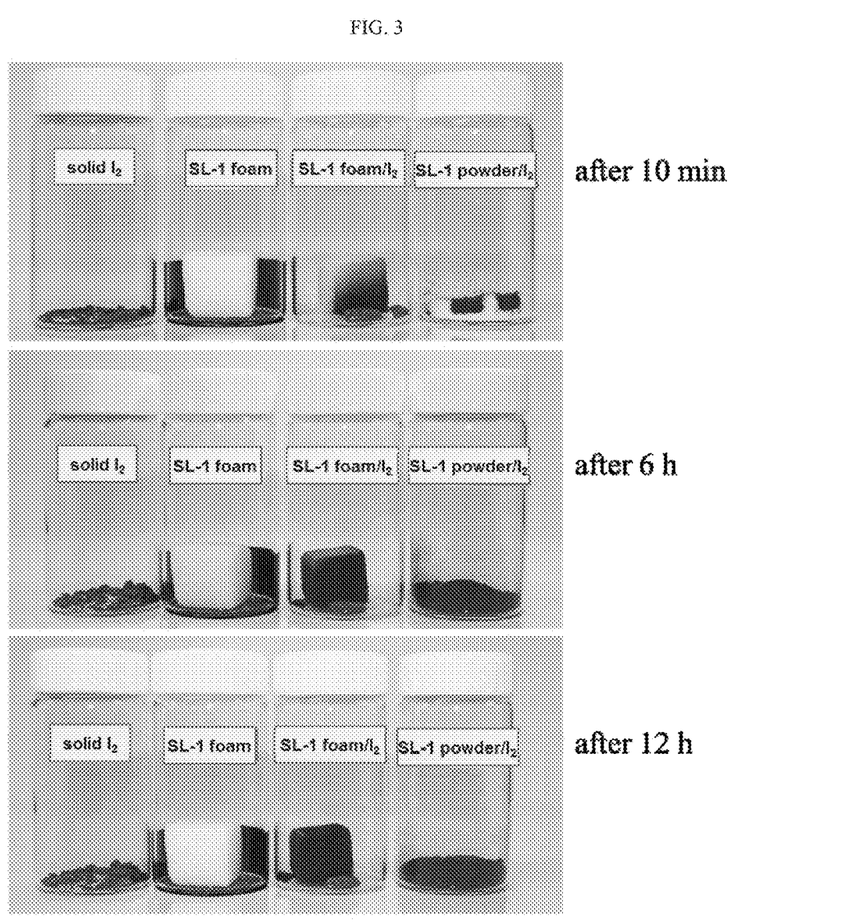
FIG. 3 shows sublimation of $I_2$ from solid $I_2$, and its absorption into silicalite foam (SL-1 form) and silicalite powder (SL-1 powder).

In addition, the adsorption of $I_2$ sublimating from solid $I_2$ was confirmed for both silicalite-1 foam (SL form) and silicalite-1 powder (SL powder) which are MFI-type zeolites (FIG. 3). From FIG. 3, it can be seen that the color of the silicalite-1 foam and silicalite-1 powder turns violet due to the adsorption of $I_2$.

Figure 4:
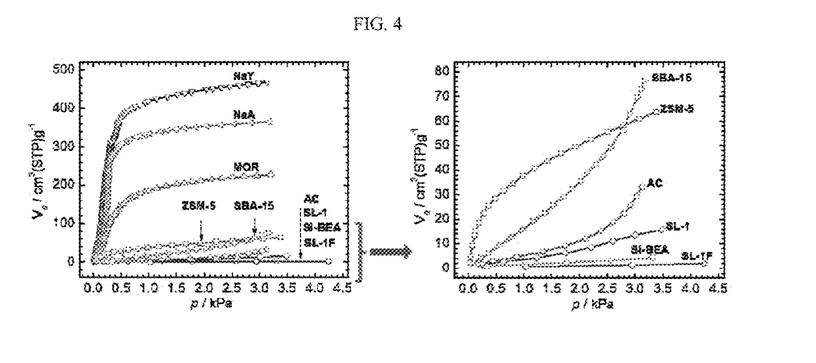
FIG. 4 compares the hydrophobicity of activated carbon (AC) and various zeolites through water vapor adsorption isotherms at 313 K (40° C.).

Meanwhile, the hydrophobicity of activated carbon (AC) and various zeolites SL-1F, Si-BEA, SL-1, ZSM-5, AgMOR, SBA-15, NaY, MOR, NaX, NaA, and CaA was investigated through water vapor adsorption isotherms at 313 K (40° C.). As seen from FIG. 4, the zeolites SL-1F, Si-BEA, SL-1, and ZSM-5 with a larger iodine ($I_2$) adsorption amount exhibit higher hydrophobicity than other zeolites. That is to say, the iodine ($I_2$) adsorption amount increases with hydrophobicity, suggesting that the adsorption of iodine ($I_2$) in the zeolite is due to hydrophobic bonding. The hydrophobicity is in the order of ZSM-5<SL-1<Si-BEA<SL-1F. Since the hydrophobicity of the zeolite increases with the Si/Al ratio, the zeolite according to the present invention capable of adsorbing iodine ($I_2$) has a Si/Al ratio (molar ratio) of 15 or greater, specifically 20 or greater, more specifically 30 or greater. For SL-1, SL-1F, and Si-BEA, which are free from Al, the Si/Al ratio is infinite (∞).

Figure 5:
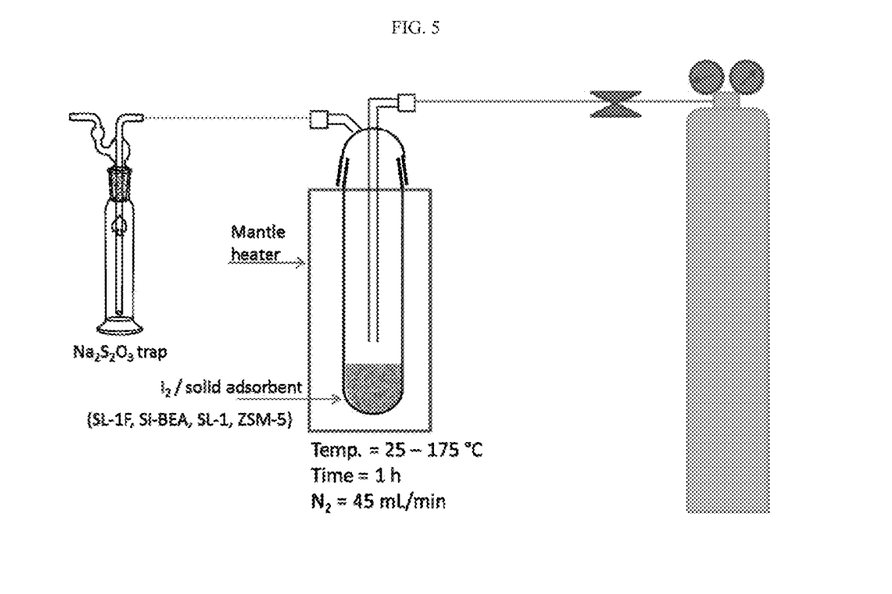
FIG. 5 shows an apparatus for desorbing $I_2$ by increasing temperature while injecting nitrogen gas.
Figure 6:
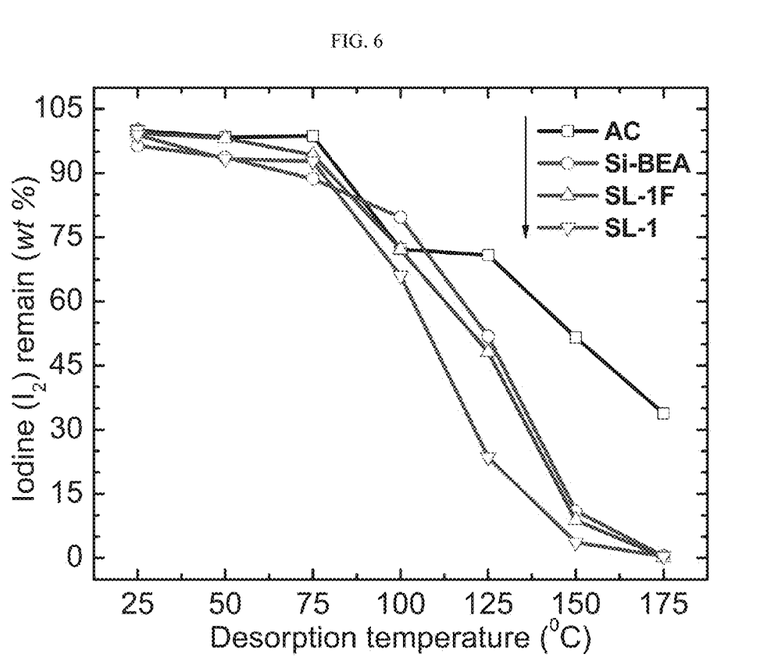
FIG. 6 shows the degree of desorption of $I_2$ from solid absorbents according to temperature.

Meanwhile, using an apparatus for desorbing $I_2$ by increasing temperature while injecting nitrogen gas as shown in FIG. 5, the degree of iodine desorption depending on temperature was investigated for activated carbon (AC) and the various zeolites Si-BEA, SL-1F, and SL-1 (FIG. 6). Although $I_2$ is highly volatile, it is not desorbed easily even at high temperatures once it is adsorbed to the zeolite. As seen from FIG. 6, $I_2$ was desorbed at 175° C. for the zeolites Si-BEA, SL-1F, and SL-1, unlike activated carbon (AC). That is to say, $I_2$ is desorbed from all of these adsorbents when hot air or hot nitrogen above a certain temperature is injected. For activated carbon (AC), some of the adsorbed $I_2$ that turned to $I^-$ remained and iodine was not completely desorbed.

Figure 7:
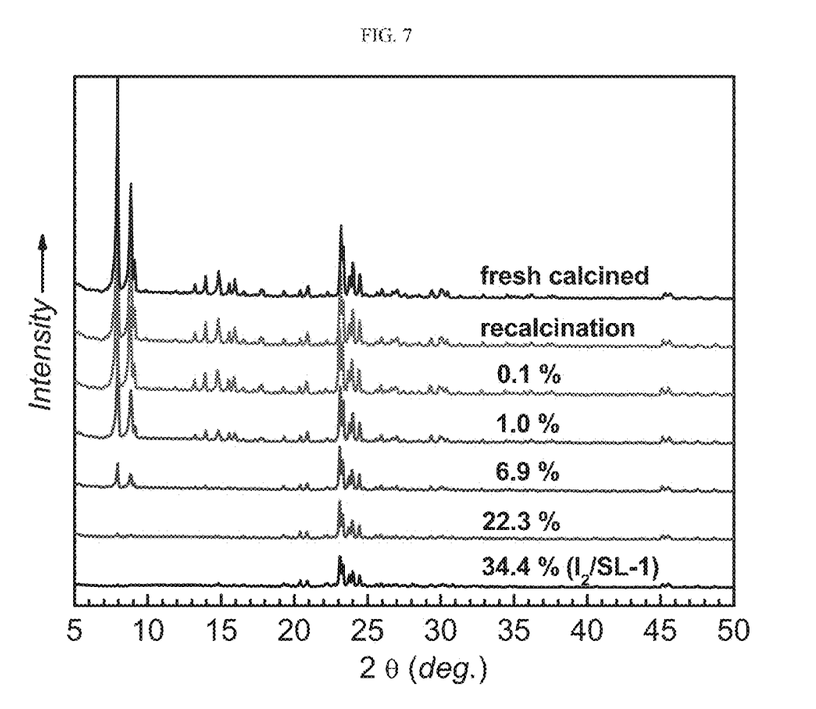
FIG. 7 shows XRD patterns of MFI-type zeolite powder (freshly calcined), MFI-type zeolite with 0.1%, 1.0%, 6.9%, 22.3%, or 34.4% $I_2$ adsorbed, and $I_2$-adsorbed MFI-type zeolite which has been recalcined (recalcination).

The XRD patterns of SL-1 powder (freshly calcined), SL-1 with 0.1%, 1.0%, 6.9%, 22.3% or 34.4% $I_2$ adsorbed, and $I_2$-adsorbed SL-1 which has been recalcined (recalcination) were investigated. As seen from FIG. 7, it was observed that the peaks related to porosity disappeared when the nanowire channel in SL-1 was completely filled with $I_2$ (34.4%). In addition, it can be seen from the XRD patterns shown in FIG. 7 that the porosity-related peaks appeared again for the $I_2$-adsorbed SL-1 which had been recalcined (recalcination), as in the fresh SL-1. This confirms that the backbone structure is maintained regardless of the adsorption and desorption of $I_2$.

Figure 8A:
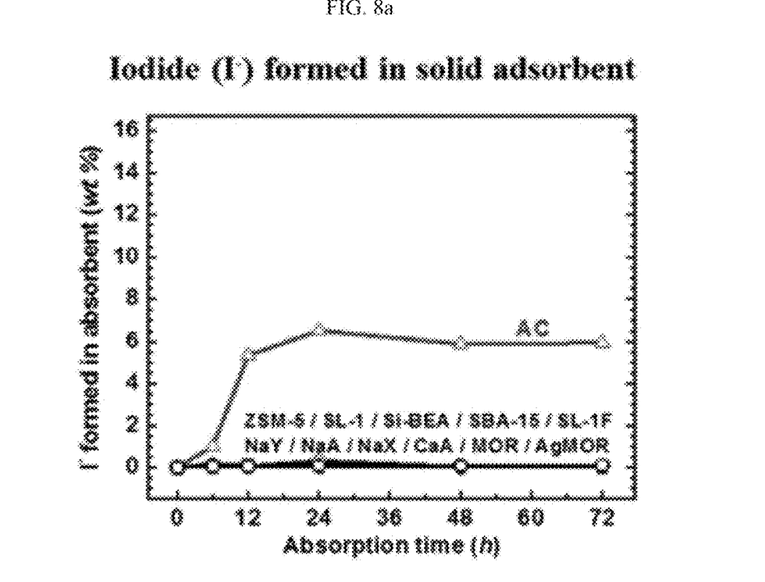
Figure 8B:
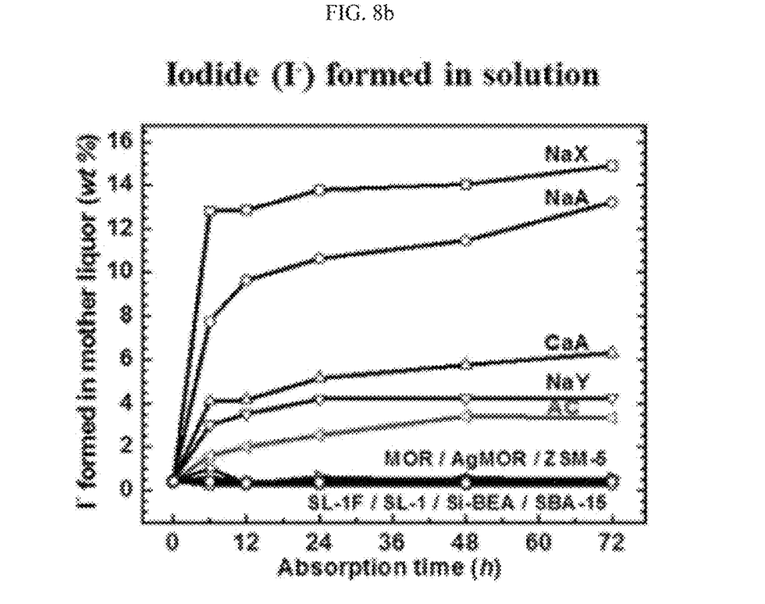
FIG. 8b shows the amount (wt %) of iodide ion ($I^-$) formed in an aqueous solution.

Meanwhile, the amount (wt %) of iodide ion (I⁻) formed inside the solid adsorbent and in a solution with time was measured for activated carbon (AC) and the various zeolites SL-1F, Si-BEA, SL-1, ZSM-5, AgMOR, SBA-15, NaY, MOR, NaX, NaA, and CaA. The results are shown in FIG. 8a and FIG. 8b, respectively. FIG. 8a shows the amount (wt %) of iodide ion (I⁻) formed inside the solid adsorbent, FIG. 8b shows the amount (wt %) of iodide ion (I⁻) formed in a solution, and FIG. 8c shows the total amount of the formed iodide ion (I⁻).

Figure 8C:
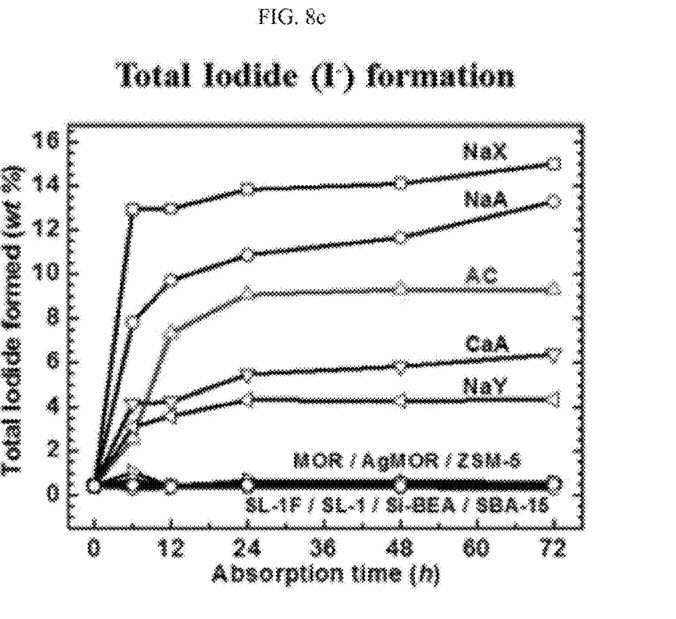
FIG. 8c shows the total amount of the formed iodide ion ($I^-$).

As seen from FIGS. 8a-8c, the amount of iodide ion (I⁻) formed inside the solid adsorbent was the highest for activated carbon (AC). The amount of iodide ion (I⁻) formed in solutions was in the order of NaX>NaA>CaA>NaY. For MOR, AgM, ZSM-5, SL-1F, SL-1, Si-BEA, and SBA-15, iodide ion (I⁻) was hardly formed either inside the solid adsorbent or in the solution.

Figure 9:
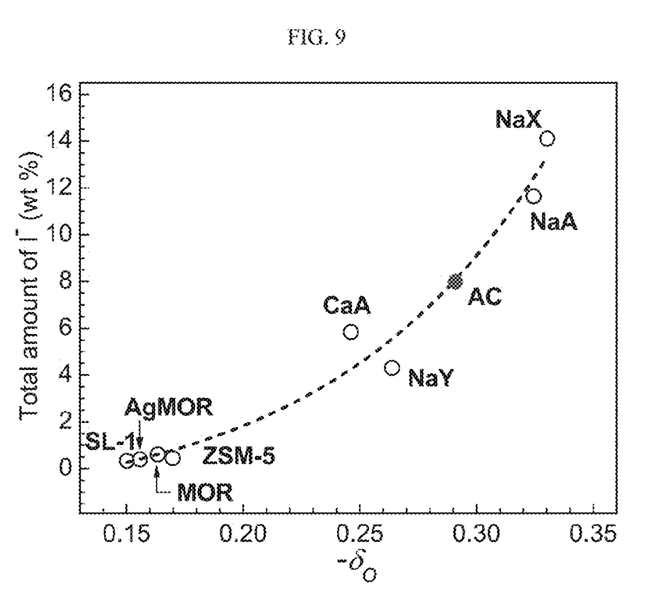
FIG. 9 shows the relationship between the Sanderson partial charge on oxygen and the total amount (wt %) of iodide ion ($I^-$) formed inside a solid absorbent and in a solution for activated carbon (AC) and various zeolites.

FIG. 9 shows the relationship between the Sanderson partial charge on oxygen and the total amount (wt %) of iodide ion (I⁻) formed inside the solid adsorbent and in the solution for activated carbon (AC) and the various zeolites SL-1F, Si-BEA, SL-1, ZSM-5, AgMOR, SBA-15, NaY, MOR, NaX, NaA and CaA.

From FIG. 9, it can be seen that the formation amount (wt %) of iodide ion (I⁻) is proportional to the Sanderson partial charge on oxygen for activated carbon (AC) and the various zeolites. Accordingly, the zeolite used as an iodine (I₂) adsorbent for preventing iodide ion (I⁻) formation may have a Sanderson partial charge on oxygen ($-\delta^O$) of specifically 0.2 or lower, more specifically 0.1-0.2.

As seen from FIGS. 1-9, the zeolites SL-1F, Si-BEA, SL-1, and ZSM-5 are advantageous in that they exhibit a high iodine ($I_2$) adsorption amount and hardly show iodide ion (I⁻) formation inside the solid adsorbent and in the solution. The zeolites SL-1F, Si-BEA, SL-1, and ZSM-5 have stronger hydrophobicity and a lower Sanderson partial charge on oxygen as compared to other zeolites.

Accordingly, the present invention is characterized in that a zeolite having a Si/Al ratio of 15 or greater is used as a zeolite for adsorbing iodine ($I_2$) and, among such zeolites, a zeolite having a Sanderson partial charge on oxygen ($-\delta^O$) of 0.2 or lower is used to prevent formation of iodide ion (I⁻) from the adsorbed $I_2$.

Figure 10:
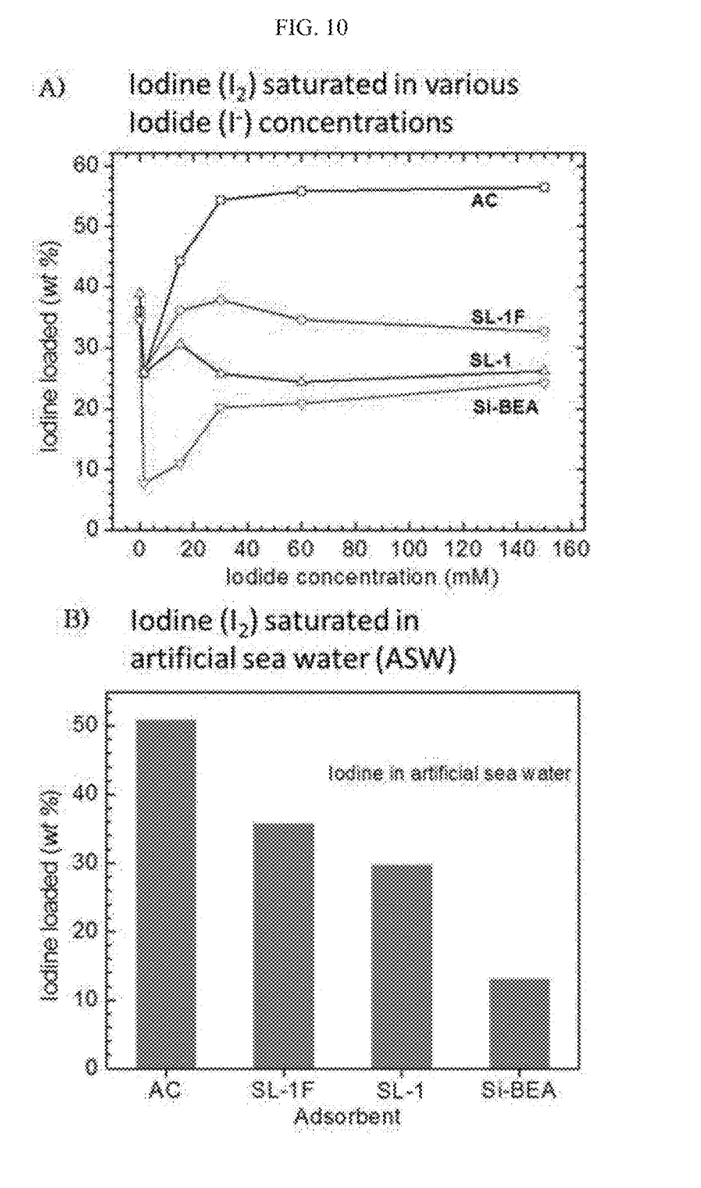
FIG. 10A shows the absorbed amount (wt %) of $I_2$ by activated carbon (AC) and various zeolites from the $I_2$-saturated aqueous iodide ($I^-$) solution with various concentrations of $I^-$.
FIG. 10B shows the absorbed amount (wt %) of $I_2$ by activated carbon (AC) and various zeolites from the $I_2$-saturated seawater.

FIG. 10A shows the $I_2$-saturated adsorption amount (wt %) of activated carbon (AC) and the various zeolites Si-BEA, SL-1F, and SL-1 under different I⁻ concentrations. It can be seen that the zeolite according to the present invention can adsorb $I_2$ even when it is dissolved in water as I⁻.

Additionally, FIG. 10B shows the $I_2$-saturated adsorption amount (wt %) of activated carbon (AC) and the various zeolites Si-BEA, SL-1F, and SL-1 in artificial seawater (ASW). It can be seen that the zeolite according to the present invention can adsorb $I_2$ even when it is dissolved in seawater.

$I_2$ is more soluble in seawater because it forms a complex. The zeolite according to the present invention can readily remove $I_2$, particularly radioactive $I_2$, when it is dissolved in seawater, underground water, etc.

Figure 11:
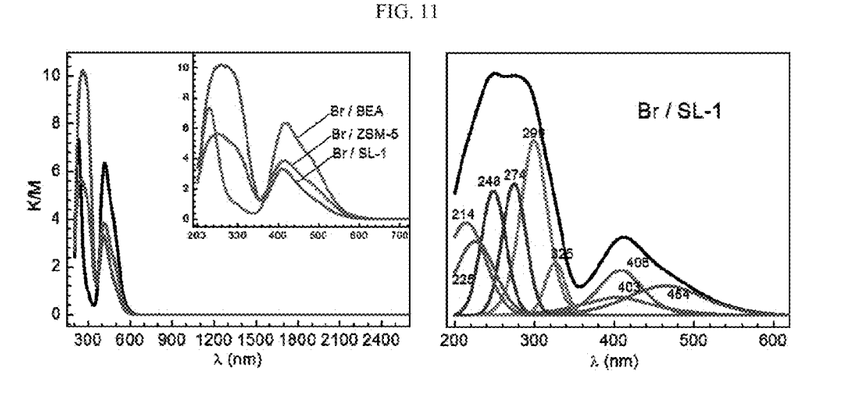
FIG. 11 shows scattering and reflection UV-Vis spectra of $Br_2$-adsorbed Si-BEA, ZSM-5, and SL-1 DML. It can be seen that the zeolites effectively adsorb $Br_2$.

Meanwhile, the zeolites of the present invention can also adsorb $Br_2$ in water (FIG. 11).

The zeolite according to the present invention can adsorb $I_2$ having not only stable I-127 but also all the isotopes of I described in Table 2.

TABLE 2

| Isotope | Half-life | Decay mode | $E_{max}$ (keV) | Main γ-X-ray energy (keV) (abundance) |
|---|---|---|---|---|
| $^{123}I$ | 13.27 h | EC + β⁺ | 1074.9 (97%, EC) | 159 (83%) |
| $^{124}I$ | 4.18 d | EC + β⁺ | 2557 (25%, EC), 3160 (24%, EC), 1535 (12%, β⁺), 2138 (11%, β⁺) | 602.7 (63%), 723 (10%), 1691 (11%) |
| $^{125}I$ | 59.41 d | EC | 150.6 (100%) | 35.5 (6.68%), 27.2 (40%), 27.5 (76%) |
| $^{126}I$ | 13.11 d | EC + β⁺, β⁻ | 869.4 (32%, β⁻), 1489 (29%, EC), 2155 (23%, EC) | 338.6 (34%), 666.3 (33%) |
| $^{127}I$ | Stable | | | |
| $^{128}I$ | 24.99 m | β⁻, EC + β⁺ | 2119 (80%, β⁻) | 442.9 (17%) |
| $^{129}I$ | 1.57 × 10⁷ y | β⁻ | 154.4 (100%) | 39.6 (7.5%), 29.5 (20%), 29.8 (38%) |
| $^{130}I$ | 12.36 h | β⁻ | 587 (47%), 1005 (48%) | 536 (99%), 668.5 (96%), 739.5 (82%) |
| $^{131}I$ | 8.02 d | β⁻ | 606 (90%) | 364.5 (82%) |
| $^{132}I$ | 2.30 h | β⁻ | 738 (13%), 1182 (19%), 2136 (19%) | 667.7 (99%), 772.6 (76%) |
| $^{132m}I$ | 1.39 h | IT, β⁻ | 1483 (8.6%, β⁻) | 600 (14%), 173.7 (8.8%) |
| $^{133}I$ | 20.8 h | β⁻ | 1240 (83%) | 529.9 (87%) |
| $^{134}I$ | 52.5 m | β⁻ | 1307 (30%) | 847 (95%), 884 (65%) |
| $^{135}I$ | 6.57 h | β⁻ | 970 (22%), 1388 (24%) | 1260 (29%) |

Half-lives of the isotopes are given as m: minutes; h: hours; d: days; and y: years.
The decay mode: EC for electron capture; β⁺ for positron emission; β⁻ for beta emission; IT for internal transfer. An isotope may decay by more than one mode.

Meanwhile, the solubility (wt %) of iodine ($I_2$) of SL-1F and BEA was compared in various organic solvents. The results are shown in Table 3. Electron donor solvents can dissolve a large amount of $I_2$ because they form electron donor-acceptor complexes. Even though silicalite-1 (SL-1F) is a weak electron donor, the solvent can dissolve a very large amount of $I_2$.

TABLE 3

| Solvent | Solubility of $I_2$ at 25° C. (g/100 mL) | Solvent density (g/mL) | Solvent weight (g) | Concentration (%) | wt % |
|---|---|---|---|---|---|
| Ethanol | 21.43 | 0.79 | 79.0 | 21.34 | 27.12 |
| Diethyl ether | 25.20 | 0.71 | 71.0 | 26.19 | 35.49 |
| AcOH | 14.09 | 1.05 | 105.0 | 11.83 | 13.42 |
| Benzene | 14.09 | 0.88 | 88.0 | 13.80 | 16.01 |
| $CHCl_3$ | 14.09 | 1.48 | 148.3 | 8.68 | 9.50 |
| $CCl_4$ | $2.603^a$ | 1.59 | 159.0 | 1.61 | 1.64 |
| Carbon disulfide ($CS_2$) | 16.47 | 1.26 | 126.0 | 11.56 | 13.07 |
| Water | $0.029^b$, $0.078^c$ | 1.00 | 100.0 | 0.029, 0.078 | 0.029, 0.078 |
| Hexane (exp. data) | 0.94 | 0.66 | 65.9 | 1.41 | 1.43 |
| Silicalite-1 (SL-1F) | 63.72 | 1.80 | 180.0(100 mL) | 26.14 | 35.40 |
| BEA | 56.96 | 1.61 | 161.0(100 mL) | 26.25 | 35.60 |
| AC | 11.55 | 0.32 | 32.0(100 mL) | 26.52 | 36.10 |

$^a$at 35° C.,
$^b$at 20° C.,
$^c$at 50° C., density of $I_2$ = 4.93 g/mL.

As can be seen from Table 3, although the $I_2$ adsorbed to the zeolite according to the present invention cannot be removed in water, it can be removed using organic solvents exhibiting high solubility for $I_2$. However, the $I_2$ adsorbed to activated carbon (AC) cannot be removed even when organic solvents exhibiting high solubility for $I_2$ are used. Since the zeolite according to the present invention is hydrophobic, it has a strong tendency to absorb the organic solvent and the absorbed organic solvent dissolves $I_2$, thereby releasing $I_2$ from the zeolite.

The zeolite according to the present invention can be recycled indefinitely since the $I_2$ adsorbed thereto can be completely removed using organic solvents such as ethanol. In contrast, activated carbon (AC) must be discarded after 3-4 uses because the $I_2$ adsorbed thereto cannot be removed by water or organic solvents. Accordingly, whereas the zeolite according to the present invention can be used indefinitely when filled into a fixed-bed column since $I_2$ adsorbed thereto can be completely removed using organic solvents, the activated carbon (AC) being filled into a fixed-bed column as an $I_2$ adsorbent requires routine replacement.

Non-limiting examples of the organic solvent for dissolving $I_2$ from the zeolite may include ethanol, diethyl ether, AcOH, benzene, $CHCl_3$, carbon disulfide or a mixture thereof.

Meanwhile, the $I_2$ recovered from the zeolite and remaining dissolved in the organic solvent may be converted to small-sized AgI or AgIO precipitates by reacting with a $AgNO_3$ aqueous solution for permanent burial.

The inventors of the present invention found that an iodine- or bromine-containing zeolite composite including a porous zeolite and iodine ($I_2$) or bromine ($Br_2$) confined in the pores of the zeolite exhibits semiconductor properties with a narrow band gap energy ($E_g$). For example, it may have a band gap energy $E_g$<3.0 eV and an electrical conductivity of 0.1 siemens/m or greater.

Specifically, a result of measuring the electrical conductivity of iodine-containing silicalite-1 ($I_2$@SL-1) by electron force microscopy was as follows:

$\sigma_a$ along $a$-axis=$1.67 \times 10^4 Sm^{-1}$ $\sigma_b$ along $b$-axis=$1.99 \times 10^4 Sm^{-1}$ In addition, since the iodine ($I_2$) captured in the iodine-containing zeolite composite according to the present invention is not evaporated at temperatures of 50° C. or lower, it allows accurate quantification of iodine. It can be applied for a variety of chemical reactions requiring iodine because an accurate known amount of iodine is released by an organic solvent if the iodine-containing zeolite composite which has been quantitated is added to a reactor.

Additionally, the iodine-containing zeolite composite according to the present invention may be used as a controlled-release system by slowly adding a solvent that enables release of iodine.

This application also holds true for the bromine-containing zeolite composite.

What is claimed is:

1. A method of adsorbing $I_2$ or $Br_2$ and converting neither the adsorbed $I_2$ to $I^-$ nor the adsorbed $Br_2$ to $Br^-$, comprising adsorbing $I_2$ or $Br_2$ on a $I_2$ or $Br_2$ adsorbent containing a zeolite having a Si/Al ratio of 15 or greater and a Sanderson partial negative charge on oxygen ($-\delta^o$) of 0.2 or lower, wherein the zeolite is selected from the group consisting of SL-1F, Si-BEA and SL-1.

2. The method of claim 1, wherein the adsorbed iodine ($I_2$) comprises radioactive iodine.

3. A method of removing $I_2$ or $Br_2$, comprising:
adsorbing $I_2$ or $Br_2$ without converting the adsorbed $I_2$ to $I^-$ or the adsorbed $Br_2$ to $Br^-$, on a $I_2$ or $Br_2$ adsorbent containing a zeolite having a Si/Al ratio of 15 or greater and a Sanderson partial negative charge on oxygen ($-\delta^o$) of 0.2 or lower, wherein the zeolite is selected from the group consisting of SL-1F, Si-BEA and SL-1;
desorbing the adsorbed $I_2$ or $Br_2$ from the zeolite by contacting the $I_2$ or $Br_2$ adsorbent with an organic solvent dissolving $I_2$ or $Br_2$, by heating the $I_2$ or $Br_2$ adsorbent, or by blowing the $I_2$ or $Br_2$ adsorbent in heated air or heated nitrogen; and
forming a precipitate by reacting the desorbed $I_2$ or $Br_2$ with $AgNO_3$.

4. The method for removing $I_2$ or $Br_2$ according to claim 3, wherein the organic solvent is ethanol, diethyl ether, AcOH, benzene, $CHCl_3$, carbon disulfide, or a mixture thereof.

* * * * *